Patented Nov. 23, 1926.

1,608,135

UNITED STATES PATENT OFFICE.

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PROCESS FOR RECOVERING RESINOUS BODIES FROM CRACKED PETROLEUM DISTILLATES.

No Drawing. Application filed April 27, 1923. Serial No. 635,125.

This invention relates to improvements in a process for refining hydrocarbon oils, and refers more particularly to the refining of cracked distillates produced by the destructive distillation of hydrocarbon oils.

Various adsorbents such as fuller's earth, bentonite, various types of clays, charcoal and other substances have been used in the refining of hydrocarbon oil, but these purifiers have not been generally applied to the refining of light distillates such as those produced in cracking processes because of the high cost of the purifying substances and the fact that there is considerable expense attached to the recovery of the purifier subsequent to its use.

It has been found that the suspended resinous matter as well as the liquid constituents, which have a tendency to form resinous matter, can be removed from cracked hydrocarbon products by adsorbence such as those mentioned. It is proposed to remove such resinous materials from the cracked distillates by the use of adsorbents with a double purpose in view—first of recovering these resinous materials for their economic value, and second—to purify and refine the cracked hydrocarbon products.

Such resinous bodies can be used in the making of varnish, shellac-like materials, insulating materials, and in making supple derivatives of the same; also for the production of innumerable other valuable substances.

The manner in which the process is carried out, is to distill the cracked distillate either with the adsorbing agent, or to filter it through such agents either by agitation with the adsorbing agent and filtering or filtering through a column of the purifying or adsorbing substance. This gives a refined or partially refined oil, while the resinous bodies are retained in the adsorbent material. The absorbent is then subjected to an extraction process with such reagents as have been found to remove the adsorbed material leaving the purifier in a condition to be reused.

Mixtures of alcohol and ether, liquid sulphur dioxide and like solvents are adaptable to use as extracting agents. The solvent or extracting agent is then evaporated, leaving as the residue the resinous material and associated compounds. These substances may be subsequently treated for further use. The residual and purified adsorbing agents as explained, can be reused for refining, preferably after heat treatment.

I claim as my invention:

1. A process of recovering resinous materials from cracked hydrocarbon distillates, consisting in distilling the oil in the presence of an adsorbing agent, subjecting said agent to the action of a solvent to remove the adsorbed materials, and evaporating the solvent liquid.

2. A process for recovering resinous materials from cracked hydrocarbon distillates, consisting in agitating the oil in the presence of an adsorbing agent, treating the adsorbing material with a solvent and removing the resinous material by evaporating the solvent.

3. A process for removing resinous material from cracked hydrocarbon distillates and for recovering such resinous material consisting in treating the distillate with an adsorbing agent, in then subjecting the adsorbing agent with the contained resinous material to the action of a solvent and in removing the resinous material by evaporating the solvent.

JACQUE C. MORRELL.